(12) United States Patent
Price

(10) Patent No.: US 9,770,683 B2
(45) Date of Patent: Sep. 26, 2017

(54) COMPRESSOR LOW COST OIL FILTER

(71) Applicant: THERMO KING CORPORATION, Minneapolis, MN (US)

(72) Inventor: Daniel Lee Price, Bloomington, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 357 days.

(21) Appl. No.: 14/286,383

(22) Filed: May 23, 2014

(65) Prior Publication Data

US 2015/0338142 A1    Nov. 26, 2015

(51) Int. Cl.
| | |
|---|---|
| F25B 43/02 | (2006.01) |
| B01D 46/00 | (2006.01) |
| F04B 17/05 | (2006.01) |
| F04B 19/22 | (2006.01) |
| F04B 53/20 | (2006.01) |
| B01D 35/027 | (2006.01) |
| F25B 43/00 | (2006.01) |
| F04B 39/02 | (2006.01) |
| F25B 31/00 | (2006.01) |

(52) U.S. Cl.
CPC ..... *B01D 46/0005* (2013.01); *B01D 35/0276* (2013.01); *F04B 17/05* (2013.01); *F04B 19/22* (2013.01); *F04B 39/0284* (2013.01); *F04B 53/20* (2013.01); *F25B 43/003* (2013.01); *F25B 31/004* (2013.01)

(58) Field of Classification Search
CPC .... F25B 31/002; F25B 31/004; F25B 43/003; F04B 39/0284; F04B 53/20; F04B 17/05; F04B 19/22; F04B 39/02; B01D 46/005; B01D 35/0276; B01D 35/00; B01D 35/005; B01D 35/147
USPC .......................................... 210/741, 97, 136
See application file for complete search history.

(56) References Cited

U.S. PATENT DOCUMENTS

| | | | |
|---|---|---|---|
| 3,432,005 A * | 3/1969 | Gates | ................... B01D 35/005 123/196 A |
| 3,687,233 A | 8/1972 | Greenwald | |
| 4,244,680 A | 1/1981 | Ishizuka et al. | |
| 4,586,875 A * | 5/1986 | Aman, Jr. | ................ F01M 1/16 184/6.24 |
| 5,159,820 A | 11/1992 | Ohishi et al. | |
| 5,246,357 A | 9/1993 | Sjoholm et al. | |
| 5,562,427 A | 10/1996 | Mangyo et al. | |
| 6,206,653 B1 | 3/2001 | Dewhirst et al. | |
| 6,315,536 B1 | 11/2001 | DeVore et al. | |
| 6,341,948 B2 | 1/2002 | Dewhirst et al. | |
| 7,566,210 B2 | 7/2009 | Elson et al. | |
| 2005/0271530 A1* | 12/2005 | Beagle | ................ F04B 39/0223 417/440 |

(Continued)

*Primary Examiner* — Len Tran
*Assistant Examiner* — Ana Vazquez
(74) *Attorney, Agent, or Firm* — Hamre, Schumann, Mueller & Larson, P.C.

(57) ABSTRACT

An internal oil filter is installed at least partially inside a crankcase and/or an oil sump of a compressor. The internal oil filter can receive oil from an oil pressure regulator and filter the oil via filter media. The received oil radially penetrates through the filter media and flow directly into the oil sump from an outside surface of the filter media. This can eliminate the need of fluid lines connecting an outlet of an oil filter to the oil sump and any sealing mechanism therebetween.

13 Claims, 6 Drawing Sheets

(56) References Cited

U.S. PATENT DOCUMENTS

| | | | |
|---|---|---|---|
| 2008/0087590 A1* | 4/2008 | Jergens | B01D 27/103 |
| | | | 210/130 |
| 2010/0032359 A1 | 2/2010 | Gillenberg et al. | |
| 2011/0280750 A1* | 11/2011 | Flanigan | F04B 27/0409 |
| | | | 417/410.1 |
| 2011/0315112 A1* | 12/2011 | Manta | F01M 1/10 |
| | | | 123/196 A |

* cited by examiner

COMPRESSOR LOW COST OIL FILTER

FIELD

The embodiments disclosed herein relate generally to a transport refrigeration system (TRS). More specifically, the embodiments described herein relate to a method and system of filtering fluid (e.g., oil) inside a compressor of a TRS.

BACKGROUND

Existing TRSs are used to cool trailers (e.g., trailer on flat cars, etc.), containers (e.g., containers on flat cars, intermodal containers, etc.), trucks, box cars and other similar transport units (typically referred to as a "refrigerated transport unit"). The cargo in the transport unit can include perishable products (e.g., food product, flowers, etc.) whereby the temperature of the refrigerated transport unit must be controlled to prevent loss of the cargo during shipment.

A TRS typically includes a transport refrigeration unit (TRU) configured to control an environmental condition within an interior space of the transport unit. The TRU can include a refrigeration circuit that includes a compressor, a condenser, an evaporator and an expansion device.

SUMMARY

The embodiments described herein relate to an oil filter internal to a compressor of a TRS.

The embodiments described herein provide a method and system for cost-effectively filtering oil inside a compressor of a TRS. In particular, an internal oil filter is installed at least partially inside a crankcase and/or an oil sump of a compressor. The internal oil filter can receive oil from an oil pressure regulator and filter the oil via filter media. The internal oil filter can be absent of a housing. For example, the received oil can radially penetrate through the filter media and flow directly into the oil sump from an outside surface of the filter media. This can eliminate the need of fluid lines connecting an outlet of an oil filter to the oil sump and any sealing mechanism therebetween, which can reduce cost and possible leakage without compromising the function of filtering oil.

In one embodiment, a method of filtering oil inside a compressor of a transport refrigeration system (TRS) is provided. The method includes pumping oil from an oil sump to an oil pressure regulator, and directing the oil from the pressure regulator to an internal oil filter. The internal oil filter is positioned inside a crankcase of the compressor. When a pressure of the oil inside the internal oil filter is equal to or less than a predetermined pressure, a pressure relief device is closed and the oil is filtered by passing through filter media. When the pressure is above the predetermined pressure, the pressure relief device is opened to direct the oil out of the internal oil filter without filtering. The oil from the internal oil filter is collected in an oil sump.

In another embodiment, a system for filtering oil inside a compressor of a transport refrigeration system (TRS) is provided. The system includes an internal oil filter positioned inside a crankcase of the compressor. The internal oil filter includes an upper endcap, a bottom endcap, and filter media sandwiched between the upper endcap and the bottom endcap. The filter media defines an inner space. A tube is inserted into the inner space of the filter media through a central opening defined at the upper endcap. The tube fluidly connects the inner space of the filter media to an outlet of an oil pressure regulator. An oil pressure relief device is positioned at the bottom endcap. The oil pressure relief device is configured to be closed when a pressure of the oil inside the internal oil filter is equal to or less than a predetermined pressure, and the oil pressure relief device is configured to be opened to direct the oil out of the internal oil filter without filtering when the pressure is above the predetermined pressure. An oil sump is configured to collect oil from the internal oil filter. The filtered oil radially penetrates through the filter media and flows directly from an outside surface of the filter media into the oil sump, and the unfiltered oil flows directly from the oil pressure relief device into the oil sump.

In yet another embodiment, a TRS compressor is provided. The TRS compressor includes a crankcase, an oil filter, a crankshaft, an oil pump and an oil sump. The oil filter includes a filter media. Also, the oil filter is disposed within the crankcase. The oil pump is configured to pump oil to the crankshaft and the oil filter. The oil sump is configured to store oil received from the crankshaft and the oil filter.

In a further embodiment, a TRS is provided. The TRS includes a refrigeration circuit that includes a compressor, a condenser, an expansion device and an evaporator. The refrigeration circuit is configured to provide temperature control within an internal space of a transport unit. The compressor includes a crankcase housing a crankshaft and an oil filter.

In yet another embodiment, an oil filter disposed in a compressor of a transport refrigeration system is provided. The oil filter includes a filter media, an upper endcap, a bottom endcap and a mounting bracket. The filter media defines an inner space. The upper endcap is attached to a top surface of the filter media. The upper end cap includes an upper opening that is in fluid communication with the inner space. The bottom endcap is attached to a bottom surface of the filter media that is opposite the top surface. The bottom endcap includes a bottom opening that is in fluid communication with the inner space. The mounting bracket is attached to the bottom surface of the bottom endcap. The mounting bracket is configured to attach to a component in the compressor.

Also, in another embodiment a method for filtering oil within a TRS compressor is provided. The TRS compressor includes an oil pump, a crankshaft and an oil filter. The method includes directing a first portion of oil from the oil pump to the oil filter. The oil filter is housed within the compressor. The method also includes directing a second portion of oil from the oil pump to a crankshaft. Also, the method includes filtering the first portion of oil directed to the oil filter. Further, the method includes directing filtered first portion of oil to the oil sump.

An advantage of these embodiments is that an oil filter can be provided internal a compressor (e.g., a reciprocal compressor) while still providing effective filtration over the life of the compressor (e.g., over 25,000 hours). This can reduce the cost of manufacturing the oil filter in comparison to an oil filter provided external to the oil filter, as the oil filter can be manufactured without a housing. Also, this can simplify the structure of the compressor housing as an inlet and outlet into the compressor housing and fluid lines are no longer needed to allow fluid communication between the oil filter and the compressor.

Other aspects of the invention will become apparent by consideration of the detailed description and accompanying drawings.

BRIEF DESCRIPTION OF THE DRAWINGS

Referring now to the drawings in which like reference numbers represent corresponding parts throughout.

DETAILED DESCRIPTION

The embodiments described herein relate to an oil filter internal to a compressor in a TRS.

The embodiments described herein provide a method and system for cost-effectively filtering oil inside a compressor of a TRS. In particular, an internal oil filter is installed at least partially inside a crankcase and/or an oil sump of a compressor. The internal oil filter can receive oil from an oil pressure regulator and filter the oil via filter media. The internal oil filter can be absent of a housing. For example, the received oil can radially penetrate through the filter media and flow directly into the oil sump from an outside surface of the filter media. This can eliminate the need of fluid lines connecting an outlet of an oil filter to the oil sump and any sealing mechanism therebetween, which can reduce cost and possible leakage without compromising the function of filtering oil.

An advantage of these embodiments is that an oil filter can be provided internal a compressor (e.g., a reciprocal compressor) while still providing effective filtration over the life of the compressor (e.g., over 25,000 hours). This can reduce the cost of manufacturing the oil filter in comparison to an oil filter provided external to the oil filter, as the oil filter can be manufactured without a housing. Also, this can simplify the structure of the compressor housing as an inlet and outlet into the compressor housing and fluid lines are no longer needed to allow fluid communication between the oil filter and the compressor.

References are made to the accompanying drawings that form a part hereof, and in which is shown by way of illustration of the embodiments in which the methods and systems described herein may be practiced. The term "refrigerated transport unit" generally refers to, for example, a conditioned trailer, container, railcars or other type of transport unit, etc. The term "transport refrigeration system" or "TRS" refers to a refrigeration system for controlling the refrigeration of a conditioned space of the refrigerated transport unit. The term "conditioned air" refers to air that has been treated so as to maintain a desired condition, for example, desired temperature or desired moisture control. The term "conditioned space" or "conditioned environment" refers to a space, a zone or an environment that receives the treated air.

It will be appreciated that the embodiments described herein may be used in any suitable transport unit such as a ship board container, an air cargo cabin, an over the road truck cabin, a rail car, etc.

Figure 1:
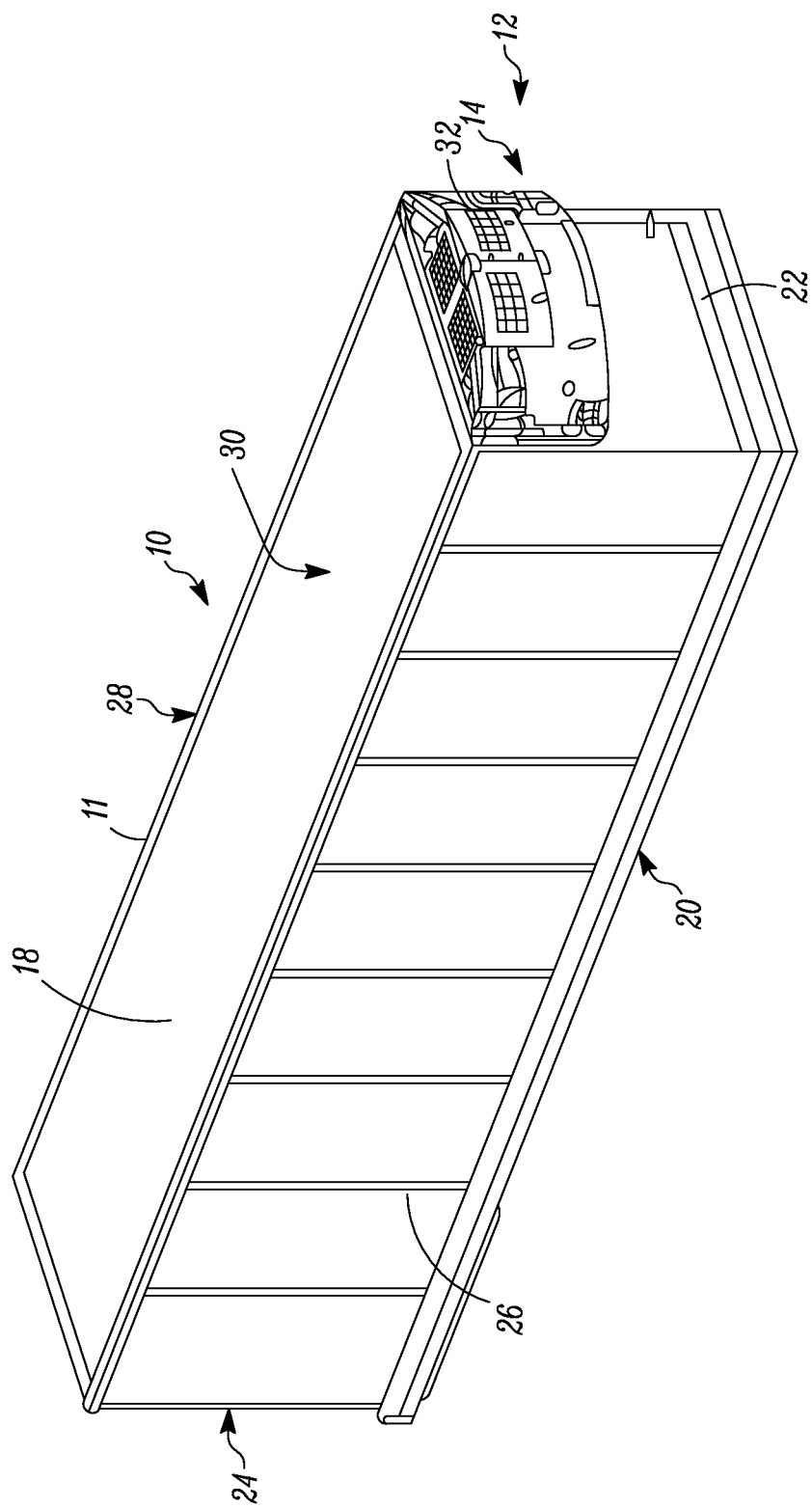
FIG. 1 illustrates a side perspective view of a conditioned transport unit with a TRS, according to one embodiment.

FIG. 1 illustrates a side view of a refrigerated transport unit 10 that includes a transport unit 11 and a transport refrigeration system (TRS) 12. The TRS 12 includes a transport refrigeration unit (TRU) 14. The transport unit 11 includes a roof 18, a floor 20, a front wall 22, a rear wall 24, and opposing sidewalls 26, 28. The TRU 14 is positioned on the front wall 22 of the transport unit 11. A conditioned cargo space 30 is defined by the roof 18, the floor 20, the front wall 22, the rear wall 24, and the opposing sidewalls 26, 28. The TRS 12 is configured to transfer heat between the conditioned cargo space 30 and the outside environment.

As shown in FIG. 1, the TRU 14 is enclosed in a housing 32. The TRU 14 is in communication with the conditioned cargo space 30 and controls the temperature in the conditioned cargo space 30. The TRU 14 includes a TRS controller (not shown), a refrigeration circuit (not shown), an engine (not shown), and a generator (not shown). The TRS controller controls the refrigeration circuit to obtain various operating conditions (e.g., temperature, humidity, etc.) of the conditioned cargo space 30. The refrigeration circuit can include, for example, an Electronic Throttle Valve (ETV, not shown), a compressor (not shown) coupled to a condenser (not shown) and an evaporator (not shown) that cools the conditioned cargo space 30 and any perishable cargo contained therein. The engine can be configured to provide power to drive the compressor and the generator.

In some embodiments, the engine may be an internal combustion engine (e.g., diesel engine, etc.) that may generally have a cooling system (e.g., water or liquid coolant system), an oil lubrication system, and an electrical system (not shown). An air filtration system (not shown) can filter air directed into a combustion chamber (not shown) of the engine. In some embodiments the engine is not specifically configured for the TRS 12, but can be a non-industrial engine such as, for example, an automotive engine. The engine can include a fuel container that is in fluid communication with the engine to deliver a supply of fuel to the engine.

While the transport unit 11 in FIG. 1 is directed to a container type transport unit, it will be appreciated that the embodiments described herein for controlling a TRU can also be used, for example, for trailers (e.g., trailer on flat cars, etc.), containers (e.g., containers on flat cars, intermodal containers, etc.), trucks, box cars and other similar transport units.

Figure 2A:
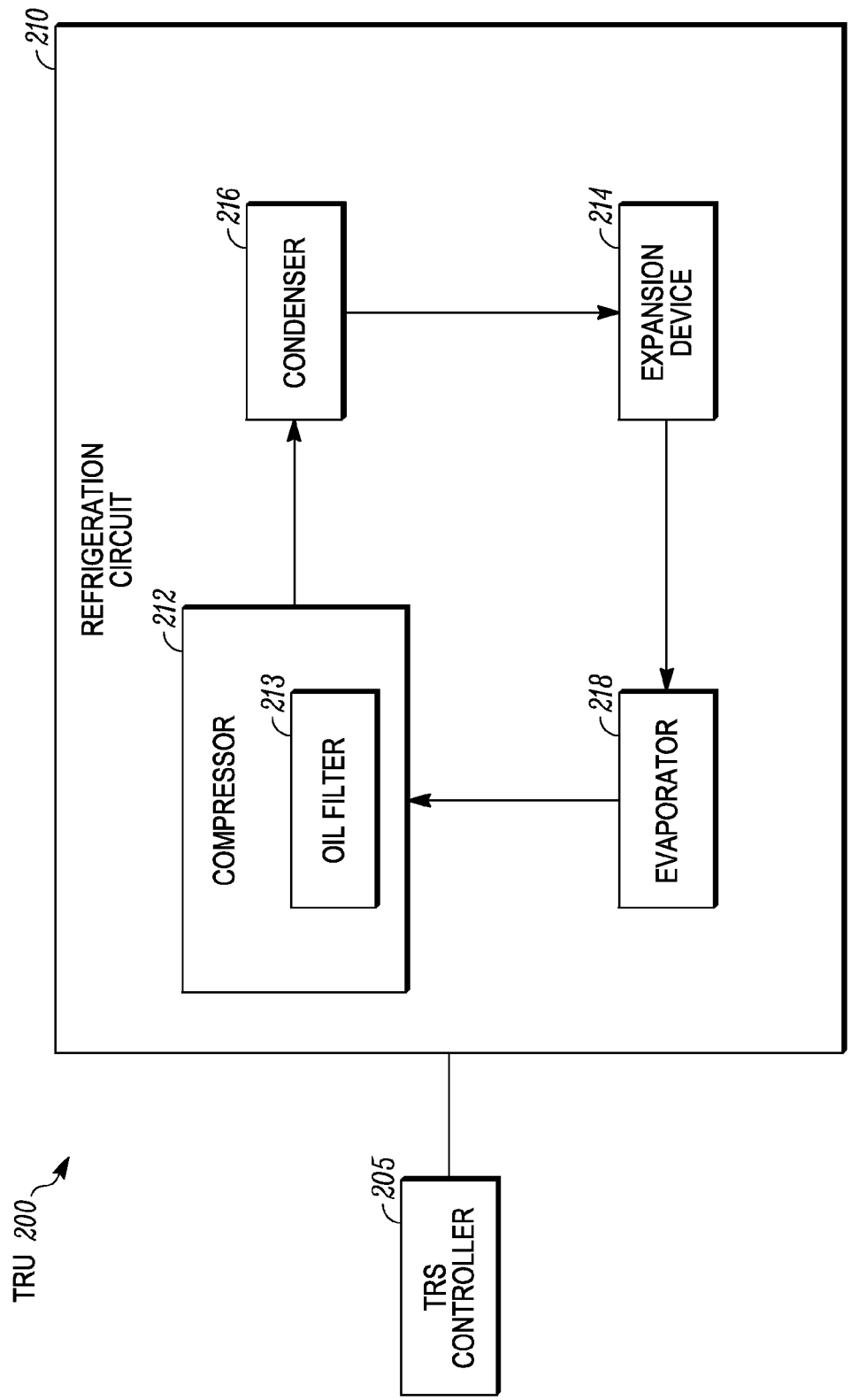
FIG. 2A illustrates a block diagram of a TRU having a compressor with an internal oil filter, according to one embodiment.

FIG. 2A illustrates a block diagram of components within a TRU 200 (such as the TRU 14 shown in FIG. 1), according to one embodiment. The TRU 200 includes a TRS controller 205 and a refrigeration circuit 210. An engine (not shown) can be configured to provide power for the TRU 200 and other components of a TRS.

The TRS controller 205 is connected to and configured to control the refrigeration circuit 210. The TRS controller 205 controls the refrigeration circuit 210 to obtain various environmental operating conditions (e.g., temperature, humidity, etc.) of an internal space (e.g., the cargo space 30 shown in FIG. 1) of a transport unit.

The refrigeration circuit 210 regulates various environmental operating conditions (e.g., temperature, humidity, etc.) of the internal space based on instructions received from the TRS controller 205. The refrigeration circuit 210 includes a compressor 212, a condenser 216, an expansion device 214, and an evaporator 218 that together provide temperature control within the internal space. In some embodiments, the compressor 212 can be a reciprocating compressor. It is to be understood that the compressor 212 can be any other type of compressor including, for example, a scroll compressor, a screw compressor, etc., that is suitable for transport refrigeration applications.

The compressor 212 requires lubrication, for example, provided by lubricating oil to operate properly. The compressor 212 includes an internal oil filter 213 that is disposed internal to the compressor 212 and configured to filter the lubricating oil. In some embodiments, the internal oil filter 213 can be disposed inside a crankcase (not shown) of the compressor 212.

It is appreciated that the size and configuration of the compressor 212 can be based on transportation considerations such as the size requirements of the TRU 200. In some embodiments, the compressor 212 can be configured to achieve anywhere between about 10 to about 50 cubic inches of displacement per revolution. In some embodiments, the compressor 212 can be configured to achieve about 30 cubic inches of displacement per revolution.

Figure 2B:
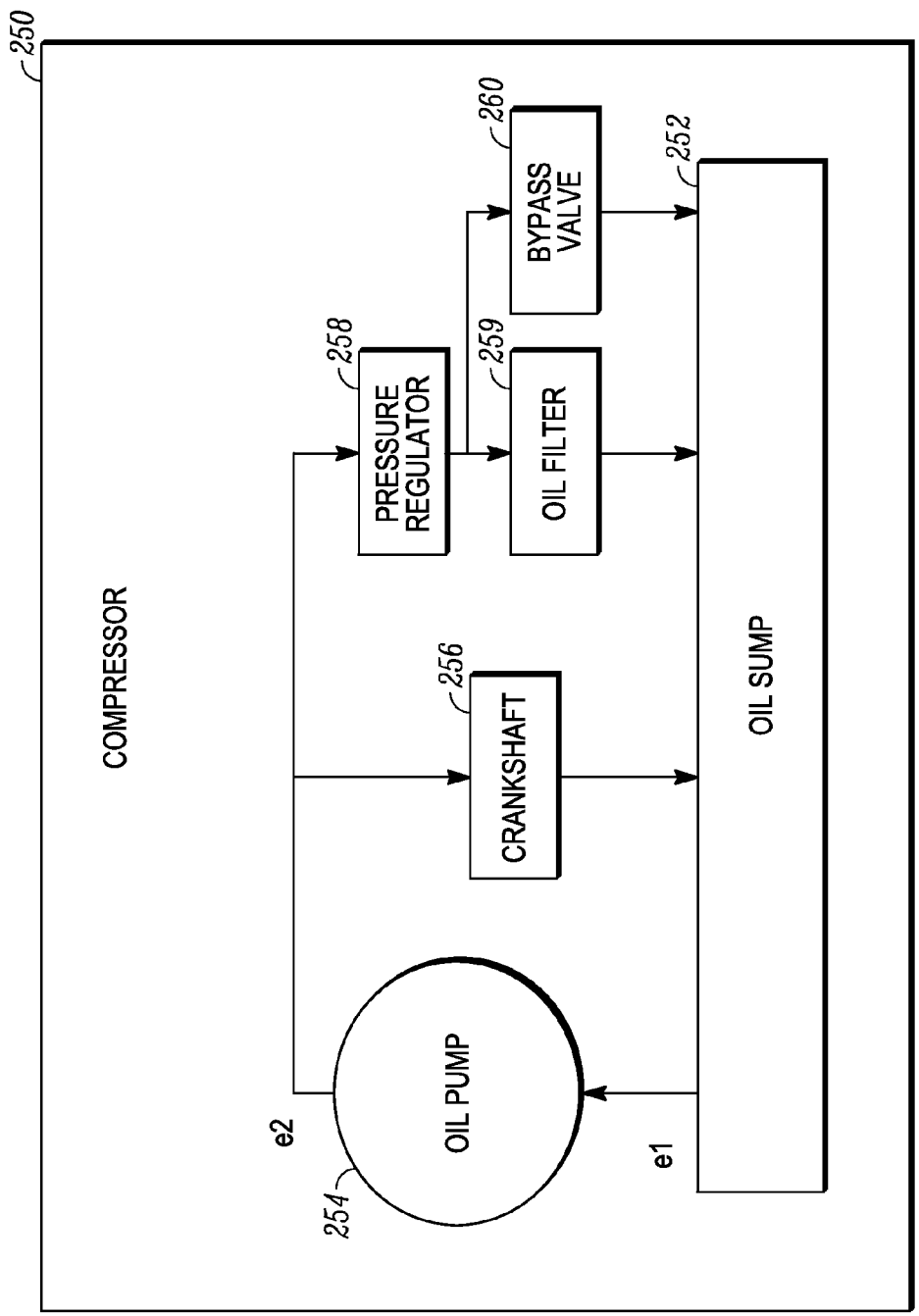
FIG. 2B illustrates a block diagram of a portion of a compressor, according to one embodiment.

FIG. 2B illustrates a block diagram of a portion of a compressor 250 where oil is provided to lubricate components such as, for example, a crankshaft 256 of the compressor 250. The compressor 250 further includes an oil sump 252, an oil pump 254, a pressure regulator 258, an internal oil filter 259, and a bypass valve 260.

The oil pump 254 is configured to pump oil from the oil sump 252 at an end e1 to an end e2. A first portion of the pumped oil at the end e2 is directed through components of the compressor 250 that require lubrication such as, for example, the crankshaft 256 (including one or more bearings, a mechanical face seal, etc. of the crankshaft 256), and directed back to the oil sump 252. A second portion of the pumped oil at the end e2 is directed to the pressure regulator 258 for regulating an oil pressure of the second portion of the pumped oil. In some embodiments, the pressure regulator 258 can be configured to regulate the oil pressure of the second portion of the pumped oil to obtain a pressure differential of about 25 to about 40 pounds per square inch differential (psid).

The bypass valve 260 is configured to allow oil to bypass filtration through the internal oil filter 259 and proceed to the oil sump 252. In some embodiments, the bypass valve can be a pressure relief device that is configured to allow oil from the pressure regulator 258 to bypass filtration through the internal oil filter 259 when a pressure differential of the oil is greater than a predetermined pressure differential. In some embodiments, the predetermined pressure differential can be a value between about 5 psid to about 10 psid. For example, the bypass valve 260 can allow oil to bypass filtration through the internal oil filter 259 when the internal oil filter 259 becomes, for example, clogged, dirty or otherwise unable to filter the oil.

An advantage of this configuration is that during conditions where there is little oil in the compressor 250 (e.g., during startup in cold weather), oil can be directed to the crankshaft 256 and provide lubrication to components of the crankshaft 256 (e.g., bearings, mechanical face seal, etc.). Once a sufficient amount of oil is available to the compressor 250, the oil can then be directed to the oil filter 259.

The internal oil filter 259 is disposed downstream of the pressure regulator 258. The internal oil filter 259 is configured to receive oil from the pressure regulator 258 and to filter the received oil. The received oil having a regulated oil pressure can be filtered with improved efficiency. The filtered oil is directed back to the oil sump 252.

In some embodiments, the internal oil filter 259 can be configured to remove particles having a minimum size anywhere between about 2 to about 5 microns. In one embodiment, the internal oil filter 259 can be configured to remove particles greater than about 5 microns.

The internal oil filter 259 includes filter media, and can be an inside-out filter that is absent of a housing. The received oil can penetrate through the filter media and flow directly into the oil sump 259 from an outside surface of the filter media. This can eliminate the need of fluid lines connecting an outlet of an oil filter to the oil sump and any sealing mechanism therebetween, which can reduce cost and possible leakage without compromising the function of filtering oil. In some embodiments, the filter media can be a synthetic filter media.

The internal oil filter 259 is configured to have a compact size so as to fit inside the compressor 250 while still providing effective filtration for the compressor 250 during the life time of the compressor 250 (e.g., over 25,000 hours).

In some embodiments, the compressor 250 can be configured to achieve anywhere between about 10 to about 50 cubic inches of displacement per revolution. In some embodiments, the compressor 250 can be configured to achieve about 30 cubic inches of displacement per revolution.

Figure 3:
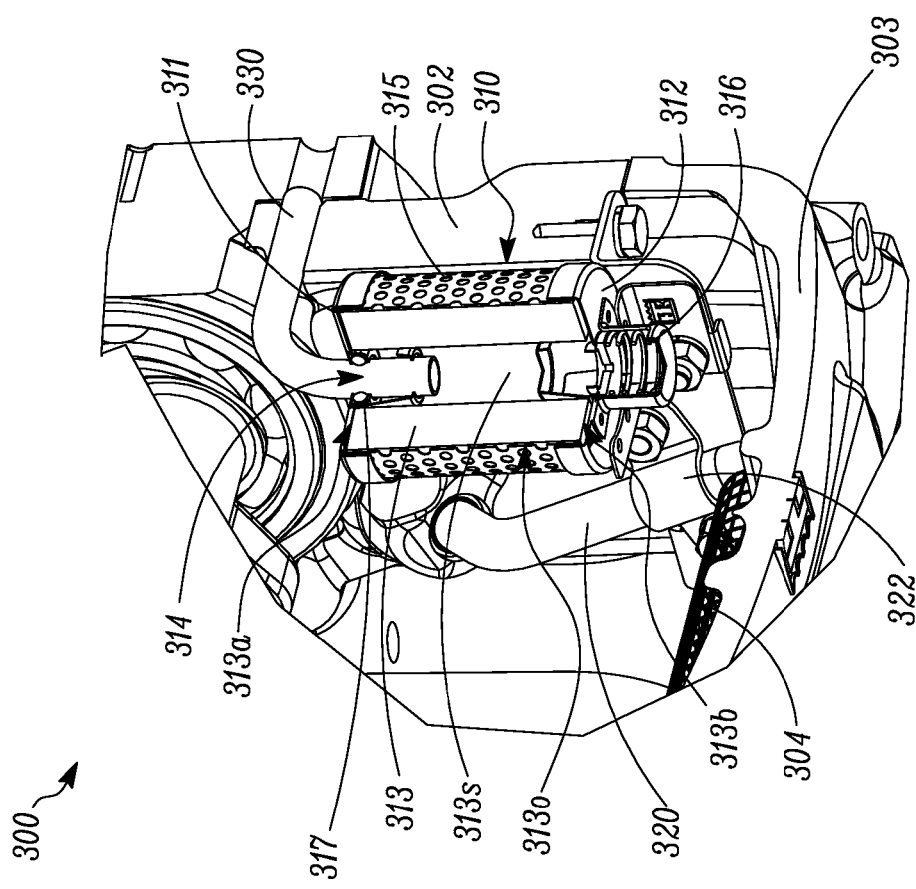
FIG. 3 illustrates a partial sectional view of a compressor with an internal oil filter in a TRS.

FIG. 3 illustrates a partial sectional view of an inside of a compressor 300. The compressor 300 includes a crankcase 302 that receives components of the compressor 300 such as, for example, a crankshaft (not shown). The compressor 300 further includes an oil sump 303 connected to a bottom end of the crankcase 302 and includes a strainer 304. Oil collected in the oil sump 303 is pumped out of the oil sump 303 by an oil pump (not shown) via an oil pick-up tube 320.

The compressor 300 also includes an internal oil filter 310 disposed inside the crankcase 302. The internal oil filter 310 is mounted to the oil pick-up tube 320 via a bracket 322. It is to be understood that the internal oil filter 310 can be mounted to other components inside the crankcase 302. In some embodiments, the internal oil filter 310 can be mounted on an inside wall of the crankcase 302. A portion of the internal oil filter 310 (e.g., a bypass valve 316) can be submerged into the oil sump 303.

The internal oil filter 310 includes an upper endcap 311, a bottom endcap 312, and filter media 313. In some embodiments, the filter media 313 can be a synthetic filter media. The filter media 313 includes a top surface 313a attached to the upper endcap 311 and a bottom surface 313b attached to the bottom endcap 312. The upper endcap 311 includes a central opening 314 configured to receive a tube 330. The tube 330 is connected to an outlet of an oil pressure regulator (not shown). The tube 330 is inserted into an inside space 313s of the filter media 313 through the central opening 314. An O-ring 317 is configured to seal the tube 330 against the central opening 314. An outside surface 313o of the filter media 313 includes a perforated liner 315 having perforations. Oil from the oil pressure regulator is directed into the inside space 313s of the filter media 313 via the tube 330, radially passes through the filter media 313, and is directed out of the internal oil filter 310 through the perforations of the perforated liner 315.

The bypass valve 316 is attached to the bottom endcap 312. The bypass valve 316 is configured to be in fluid communication with the inside space 313s of the filter media 313. In the embodiment shown in FIG. 3, the bypass valve 316 operates as an oil pressure relief device. The bypass valve 316 is configured to open when an oil pressure in the inside space 313s is above a predetermined pressure so that oil can be directed out of the inside space 313s through the bypass valve 316. When the oil pressure in the inside space 313s is equal to or less than the predetermined pressure, the bypass valve 316 is closed and the oil radially passes through the filter media 313. The filtered oil flows from the outside surface 313o of the filter media 313 directly into the oil sump 303. The unfiltered oil flows from the bypass valve 316 and is collected by the oil sump 303. The bracket 322 is attached to a bottom surface of the bottom endcap 312 and is radially spaced from the bypass valve 316.

Figure 4:
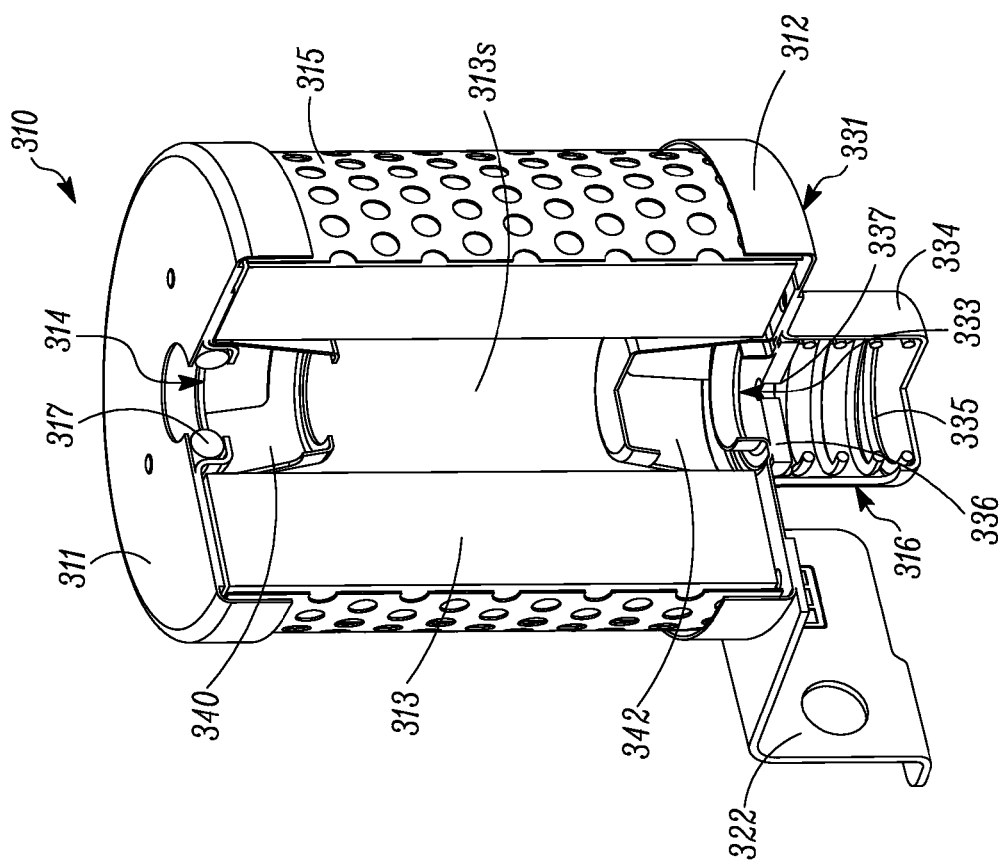
FIG. 4 illustrates a sectional view of the internal oil filter of FIG. 3.

FIG. 4 illustrates a sectional view of the internal oil filter 310 of FIG. 3. The bottom endplate 312 of the internal oil filter 310 includes a ring shaped plate 331 and a central opening 333 in fluid communication with the inside space 313s of the filter media 313. The bypass valve 316 includes a bypass valve retainer 334 that houses a bypass valve spring 335 and a bypass valve flat plate 336. The bypass valve flat plate 336 includes an orifice 337 near its center. At least a portion of the bypass valve spring 335 and the bypass valve flat plate 336 is received by the central opening 333.

When an oil pressure differential in the inside space 313s is equal to or less than a predetermined pressure differential, the bypass valve flat plate 336 is biased by the bypass valve spring 335 to block the central opening 333 and the bypass valve 316 is closed. When the oil pressure in the inside space 313s is greater than a predetermined pressure differential, the bypass valve flat plate 336 is pushed by the oil pressure differential toward the bypass valve spring 335. The bypass valve 316 is thereby opened and the oil inside the filter media 313 can flow out of the internal oil filter 310 via the opening 333. In some embodiments, the predetermined pressure differential can be any value between about 5 to about 10 psid.

It is to be understood that bypass valve 316 can have other configurations as long as the bypass valve 316 can open/close upon the change of the oil pressure differential in the inside space 313s. In some embodiments, the bypass valve 316 can include a ball biased by a spring to block/unblock the opening 333.

In some embodiments, the internal oil filter 310 can be configured to remove particles having a minimum size anywhere between about 2 to about 5 microns. In one embodiment, the internal oil filter 310 can be configured to remove particles greater than about 5 microns.

The internal oil filter 310 is configured to have a compact size so as to fit inside the compressor 300 while still providing effective filtration for the compressor 300 during the life time of the compressor 300 (e.g., over 25,000 hours).

In one embodiment, the internal oil filter 310 can have a height from the a top surface of the upper endcap 311 to a bottom portion of the bracket 322 between about 3.0 to about 3.5 inches and a height from a top surface of the upper endcap 311 to a bottom surface of the bottom endcap 312 between about 2.3 to about 2.7 inches. The height of the bypass valve 316 can be between about 0.5 to about 0.8 inches. Also, the upper endcap 311 and the bottom endcap 312 can each have a radius between about 0.9 inches to about 1.2 inches.

Figure 5:
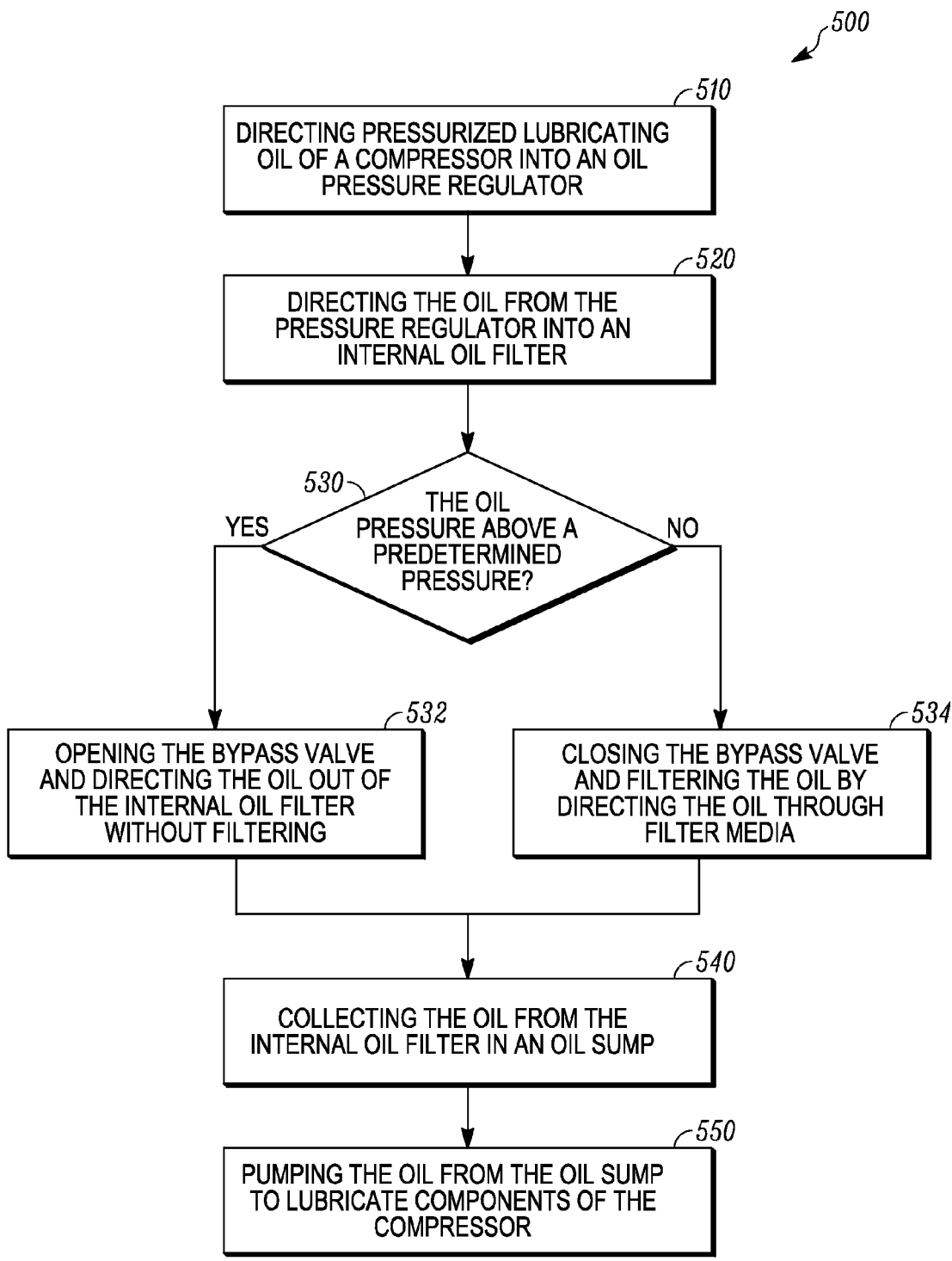
FIG. 5 illustrates a flow diagram of filtering oil inside a compressor in a TRS.

FIG. 5 illustrates a flow diagram of a method 500 of filtering oil inside the compressor 300 of FIG. 3, according to one embodiment. At 510, lubricating oil of the compressor 300 is directed into an oil pressure regulator, for example, the pressure regulator 258 in FIG. 2B, for regulating the pressure of the oil. The method 500 then proceeds to 520.

At 520, the pressure-regulated oil is directed into the internal oil filter 310. The method 500 then proceeds to 530.

At 530, the bypass valve 316 determines whether an oil pressure at the inside space 313s is above a predetermined pressure. If the oil pressure is above the predetermined pressure, the method proceeds to 532. If the oil pressure is equal to or less than the predetermined pressure, the method proceeds to 534.

At 532, the bypass valve 316 is opened and the oil is directed out of the internal oil filter 310 via the bypass valve 316. The method 500 then proceeds to 540.

At 534, the bypass valve 316 is closed and the oil is filtered by passing through the filter media 313. The method 500 then proceeds to 540.

At 540, the oil from the internal oil filter is collected by the oil sump 303. The method 500 then proceeds to 550.

At 550, the oil is pumped, via an oil pump, from the oil sump 303 to lubricate components, e.g., a crankshaft, of the compressor 300.

Aspects:

It is noted that any of aspects 1-9, 10-19, 20-26 and 27-30 below can be combined.

1. A transport refrigeration system (TRS) compressor, the compressor comprising:
   a crankcase;
   an oil filter including a filter media, the oil filter disposed within the crankcase;
   a crankshaft;
   an oil pump configured to pump oil to the crankshaft and the oil filter; and
   an oil sump configured store oil received from the crankshaft and the oil filter.
2. The TRS compressor of aspect 1, further comprising a pressure regulator in fluid communication with the oil pump and the oil filter, the pressure regulator configured to regulate an oil pressure of oil directed from the oil pump to the oil filter.
3. The TRS compressor of any of aspects 1-2, wherein the TRS compressor is configured to achieve between about 10 to about 50 cubic inches of displacement per revolution.
4. The TRS compressor of any of aspects 1-2, wherein the TRS compressor is configured to achieve about 30 cubic inches of displacement per revolution.
5. The TRS compressor of any of aspects 1-4, wherein the oil filter includes a bypass valve having an open state and a closed state and being configured to, in the open state, allow oil from the oil pump that enters the oil filter to bypass filtration through the filter media and to exit the oil filter to the oil sump.
6. The TRS compressor of aspect 5, wherein the bypass valve is a pressure relief device and is configured to be in the open state when a pressure differential in the oil filter is greater than a predetermined pressure differential value and is configured to be in the closed state when the pressure differential in the oil filter is less than or equal to the predetermined pressure differential value.
7. The TRS compressor of aspect 6, wherein the predetermined pressure differential value is a value set between about 5 to about 10 psid.
8. The TRS compressor of any of aspects 1-7, further comprising an oil pickup tube in fluid communication with the oil pump and the oil filter, the oil pickup tube configured to direct oil from the oil pump to the oil filter, the oil filter including a mounting bracket, and
   wherein the oil filter is attached to the oil pickup tube via the mounting bracket.
9. The TRS compressor of any of aspects 1-8, wherein a portion of the oil filter is disposed in the oil sump.
10. A transport refrigeration system (TRS) comprising:
    a refrigeration circuit that includes a compressor, a condenser, an expansion device and an evaporator, the refrigeration circuit configured to provide temperature control within an internal space of a transport unit;

the compressor including a crankcase housing a crankshaft and an oil filter.
11. The TRS of aspect 10, the compressor including:
an oil pump configured to pump oil to the crankshaft and the oil filter; and
an oil sump configured store oil received from the crankshaft and the oil filter.
12. The TRS of aspect 11, the compressor including a pressure regulator in fluid communication with the oil pump and the oil filter, the pressure regulator configured to regulate an oil pressure of oil directed from the oil pump to the oil filter.
13. The TRS of any of aspects 10-12, wherein the compressor is configured to achieve between about 10 to about 50 cubic inches of displacement per revolution.
14. The TRS of any of aspects 10-12, wherein the compressor is configured to achieve about 30 cubic inches of displacement per revolution.
15. The TRS of any of aspects 11-14, the oil filter including a filter media, wherein the oil filter includes a bypass valve having an open state and a closed state and being configured to, in the open state, allow oil from the oil pump that enters the oil filter to bypass filtration through the filter media and to exit the oil filter to the oil sump.
16. The TRS of aspect 15, wherein the bypass valve is a pressure relief device and is configured to be in the open state when a pressure differential in the oil filter is greater than a predetermined pressure differential value and is configured to be in the closed state when the pressure differential in the oil filter is less than or equal to the predetermined pressure differential value.
17. The TRS compressor of aspect 16, wherein the predetermined pressure differential value is a value set between about 5 to about 10 psid.
18. The TRS of any of aspects 10-17, further comprising an oil pickup tube in fluid communication with the oil pump and the oil filter, the oil pickup tube configured to direct oil from the oil pump to the oil filter,
the oil filter including a mounting bracket, and
wherein the oil filter is attached to the oil pickup tube via the mounting bracket.
19. The TRS of any of aspects 10-18, wherein a portion of the oil filter is disposed in the oil sump.
20. An oil filter disposed in a compressor of a transport refrigeration system, the oil filter comprising:
a filter media defining an inner space;
an upper endcap attached to a top surface of the filter media, the upper end cap including an upper opening that is in fluid communication with the inner space;
a bottom endcap attached to a bottom surface of the filter media that is opposite the top surface, the bottom endcap including a bottom opening that is in fluid communication with the inner space; and
a mounting bracket attached to the bottom surface of the bottom endcap, the mounting bracket configured to attach to a component in the compressor.
21. The oil filter of aspect 20, further comprising a bypass valve attached to a bottom surface of the bottom endcap and in fluid communication with the bottom opening, the bypass valve having an open state and a closed state and being configured to, in the open state, allow oil that enters the oil filter via the upper opening to bypass filtration through the filter media and to exit the oil filter via the bottom opening.
22. The oil filter of aspect 21, wherein the bypass valve is a pressure relief device and is configured to be in the open state when a pressure differential in the oil filter is greater than a predetermined pressure differential value and is configured to be in the closed state when the pressure differential in the oil filter is less than or equal to the predetermined pressure differential value.
23. The oil filter of aspect 22, wherein the predetermined pressure differential value is a value between about 5 psid and about 10 psid.
24. The oil filter of aspect 22, wherein the predetermined pressure differential value is about 10 psid.
25. The oil filter of any of aspects 20-24, wherein the oil filter is configured to allow oil to enter the oil filter via the upper opening into the inner space, radially pass through the filter media from an inner surface of the filter media to an outer surface of the filter media.
26. The oil filter of any of aspects 20-25, a filter media defining an inner space;
an upper endcap attached to a top surface of the filter media, the upper end cap including an upper opening that is in fluid communication with the inner space;
a bottom endcap attached to a bottom surface of the filter media that is opposite the top surface, the bottom endcap including a bottom opening that is in fluid communication with the inner space; and
a mounting bracket attached to the bottom surface of the bottom endcap, the mounting bracket configured to attach to a component in the compressor.
27. A method for filtering oil within a transport refrigeration system (TRS) compressor that includes an oil pump, a crankshaft and an oil filter, the method comprising:
directing a first portion of oil from the oil pump to the oil filter, wherein the oil filter is housed within the compressor;
directing a second portion of oil from the oil pump to a crankshaft;
filtering the first portion of oil directed to the oil filter;
directing filtered first portion of oil to the oil sump.
28. The method of aspect 27, further comprising:
lubricating components of the crankshaft with the second portion of oil; and
directing the second portion of oil from the crankshaft to the oil sump.
29. The method of any of aspects 27-28, wherein directing the first portion of oil from the oil pump to the oil filter includes:
directing the first portion of oil from the oil pump to a pressure regulator of the compressor;
the pressure regulator regulating a pressure of the first portion of oil from the oil pump to a regulated pressure; and
directing pressure regulated first portion of oil from the pressure regulator to the oil filter.
30. The method of any of aspects 27-29, further comprising:
directing the first portion of oil from the oil filter to the oil sump via a bypass valve of the oil filter to bypass filtration of the first portion of oil when an oil pressure of the first portion of oil in the oil filter is greater than a predetermined pressure threshold; and
directing the first portion of oil through a filter media of the oil filter to filter the first portion of oil and directing the filtered first portion of oil to the oil sump when the oil pressure of the first portion of oil in the oil filter is lower than the predetermined pressure threshold.

With regard to the foregoing description, it is to be understood that changes may be made in detail, especially in matters of the construction materials employed and the shape, size and arrangement of the parts without departing from the scope of the present invention.

It is intended that the specification and depicted embodiment to be considered exemplary only, with a true scope and spirit of the invention being indicated by the broad meaning of the claims.

The invention claimed is:

1. A transport refrigeration system (TRS) comprising:
a refrigeration circuit that includes a compressor, a condenser, an expansion device and an evaporator, the refrigeration circuit configured to provide temperature control within an internal space of a transport unit;
the compressor including:
a crankcase;
a crankshaft;
an oil filter, the crankshaft and the oil filter being positioned inside the crankcase;
an oil pump configured to pump oil to the crankshaft and the oil filter;
an oil sump configured to store oil received from the crankshaft and the oil filter; and
a pressure regulator in fluid communication with the oil pump and the oil filter, the pressure regulator configured to regulate an oil pressure of oil directed from the oil pump to the oil filter,
wherein the oil filter is disposed downstream of the pressure regulator and the oil sump is disposed downstream of the oil filter so that a first portion of oil flows from the oil pump to the pressure regulator, then to the oil filter, and then to the oil sump; and
wherein the oil filter is an inside-out filter that is absent of a housing, the oil filter includes a filter media, and oil received from the pressure regulator penetrates through the filter media and flows into the oil sump from an outside surface of the filter media.

2. The TRS of claim 1, wherein the compressor is configured to achieve between about 10 to about 50 cubic inches of displacement per revolution.

3. The TRS of claim 1, wherein the compressor is configured to achieve about 30 cubic inches of displacement per revolution.

4. The TRS of claim 1, the oil filter including a filter media, wherein
the oil filter includes a bypass valve having an open state and a closed state and being configured to, in the open state, allow oil from the oil pump that enters the oil filter to bypass filtration through the filter media and to exit the oil filter to the oil sump; and
the bypass valve is positioned downstream of the oil filter so that oil from the oil pump enters the oil filter before reaching the bypass valve.

5. The TRS of claim 4, wherein the bypass valve is a pressure relief device and is configured to be in the open state when a pressure differential in the oil filter is greater than a predetermined pressure differential value and is configured to be in the closed state when the pressure differential in the oil filter is less than or equal to the predetermined pressure differential value.

6. The TRS of claim 5, wherein the predetermined pressure differential value is a value set between about 5 to about 10 psid.

7. The TRS of claim 1, further comprising an oil pickup tube in fluid communication with the oil pump and the oil filter, the oil pickup tube configured to direct oil from the oil pump to the oil filter,
the oil filter including a mounting bracket, and
wherein the oil filter is attached to the oil pickup tube via the mounting bracket.

8. The TRS of claim 1, wherein a portion of the oil filter is disposed in the oil sump.

9. The TRS of claim 1, the compressor including an oil pickup tube and an oil returning tube, wherein the filter media defines an inner space, and the oil filter further comprises
an upper endcap attached to a top surface of the filter media, the upper end cap including an upper opening that is in fluid communication with the inner space;
a bottom endcap attached to a bottom surface of the filter media that is opposite the top surface, the bottom endcap including a bottom opening that is in fluid communication with the inner space; and
a mounting bracket attached to the bottom surface of the bottom endcap, the mounting bracket configured to attach to a component in the compressor,
wherein the oil filter is attached to the oil pickup tube via the mounting bracket;
the oil pickup tube is configured to direct oil from the oil pump to the pressure regulator, the oil pickup tube is in fluid communication with the oil pump and the pressure regulator;
the oil returning tube is connected to an outlet of the pressure regulator and is inserted inside the inner space through the upper opening so that oil from the pressure regulator is directed to the oil filter via the oil returning tube;
the oil filter includes a bypass valve having an open state and a closed state and being configured to, in the open state, allow oil from the oil pump that enters the oil filter to bypass filtration through the filter media and to exit the oil filter to the oil sump;
the bypass valve is positioned in the oil sump, the bypass valve is attached to the bottom endcap, and the bypass valve is configured to be in fluid communication with the inner space;
the bypass valve includes a bypass valve retainer that houses a bypass valve spring and a bypass valve flat plate, wherein when a pressure differential in the oil filter is greater than a predetermined pressure differential value, the bypass valve flat plate is pushed by the pressure differential toward the bypass valve spring, and the bypass valve is in the open state; when the pressure differential in the oil filter is less than or equal to the predetermined pressure differential value, the bypass valve flat plate is biased by the bypass valve spring to block the bottom opening, and the bypass valve is in the close state;
the bypass valve is positioned downstream of the oil filter so that oil from the oil pump enters the oil filter before reaching the bypass valve; and
the mounting bracket is radially spaced from the bypass valve.

10. The TRS of claim 1, wherein the crankshaft is disposed downstream of the oil pump so that a second portion of oil flows from the oil pump to the crankshaft and then to the oil sump.

11. The TRS of claim 1, wherein a portion of the oil filter is disposed outside of the oil sump.

12. The TRS of claim 1, wherein the oil filter is configured to remove particles having a minimum size between about 2 to about 5 microns.

13. A transport refrigeration system (TRS) comprising:
a refrigeration circuit that includes a compressor, a condenser, an expansion device and an evaporator, the refrigeration circuit configured to provide temperature control within an internal space of a transport unit;

the compressor including:
- a crankcase;
- a crankshaft;
- an oil filter, the crankshaft and the oil filter being positioned inside the crankcase;
- an oil pump configured to pump oil to the crankshaft and the oil filter; and
- an oil sump configured to store oil received from the crankshaft and the oil filter,
- wherein the oil sump is disposed downstream of the oil filter so that a first portion of oil flows from the oil pump to the oil filter and then to the oil sump;
- the oil filter includes a filter media;
- the oil filter includes a bypass valve having an open state and a closed state and being configured to, in the open state, allow oil from the oil pump that enters the oil filter to bypass filtration through the filter media and to exit the oil filter to the oil sump; and
- the bypass valve is positioned downstream of the oil filter so that oil from the oil pump enters the oil filter before reaching the bypass valve;
- wherein the oil filter is an inside-out filter that is absent of a housing, the oil filter includes the filter media, and oil received from the pressure regulator penetrates through the filter media and flows into the oil sump from an outside surface of the filter media.

* * * * *